United States Patent
Wong

(10) Patent No.: US 6,838,188 B1
(45) Date of Patent: Jan. 4, 2005

(54) MAGNETIC RECORDING MEDIUM HAVING TERNARY OR QUATERNARY ALLOY SEEDLAYER

(75) Inventor: Bunsen Y. Wong, San Diego, CA (US)

(73) Assignee: Maxtor Corporation, Longmont, CO (US)

(*) Notice: Subject to any disclaimer, the term of this patent is extended or adjusted under 35 U.S.C. 154(b) by 457 days.

(21) Appl. No.: 09/584,765

(22) Filed: May 30, 2000

(51) Int. Cl.$^7$ .............................. G11B 5/64; G11B 5/73
(52) U.S. Cl. .................... 428/611; 428/637; 428/651; 428/661; 428/667; 428/678; 428/694 TS
(58) Field of Search .................... 428/621, 651, 428/661, 694 TS, 611, 637, 667, 668, 678

(56) References Cited

U.S. PATENT DOCUMENTS

| | | | | |
|---|---|---|---|---|
| 4,652,499 | A |   | 3/1987 | Howard ....................... 428/641 |
| 5,693,426 | A |   | 12/1997 | Lee et al. .................... 428/611 |
| 5,800,931 | A | * | 9/1998 | Lee et al. .................... 428/611 |
| 5,846,648 | A | * | 12/1998 | Chen et al. .................. 428/332 |
| 5,939,202 | A | * | 8/1999 | Ataka et al. ................. 428/457 |
| 6,090,496 | A | * | 7/2000 | Kanazawa et al. .......... 428/617 |
| 6,159,625 | A | * | 12/2000 | Ueno ....................... 428/694 T |
| 6,174,598 | B1 | * | 1/2001 | Suzuki et al. ................ 428/332 |
| 6,228,515 | B1 | * | 5/2001 | Shin et al. ............. 428/694 TS |
| 6,248,416 | B1 | * | 6/2001 | Lambeth et al. ............. 360/135 |
| 6,309,765 | B1 | * | 10/2001 | Suekane et al. ....... 428/694 TS |

OTHER PUBLICATIONS

Lambeth, David N. et al., "Magnetic Media Performance: Control Methods For Crystalline Texture and Orientation", submitted for Publication in *MRS Proceedings* MRS Sym L: Paper #L8.1, Apr. 15, 1998 (Jun. 1, 1998), 12 pp.

* cited by examiner

*Primary Examiner*—Terrel Morris
*Assistant Examiner*—Kevin M. Bernatz
(74) *Attorney, Agent, or Firm*—David M. Sigmond

(57) ABSTRACT

A magnetic recording medium such as a magnetic disk includes a NiP or ceramic glass substrate on which a seedlayer is sputtered in a low pressure inert gas atmosphere, the seedlayer comprising a ternary or quaternary alloy formed from a B2 lattice type alloy such as NiAl, CoTi, CoAl, NiTi, FeTi, CoFe, CoHf, CuZn, CoZr, and MnAl. For quaternary alloys in which elements X and Y are added to the B2 type alloy, X can be chosen from one or more elements selected from the group consisting of Co, Ni, Fe, Cu, V, Mn, and Zn, and Y can be chosen from one or more elements selected from the group consisting of Al, Nb, Ta, Hf, Zr, Zn, Ag, Au, Pt and Pd. The resulting seedlayer preferably has an A2 lattice structure.

26 Claims, 6 Drawing Sheets

Effect of $Ni_{40}Al_{40}Mo_{20}$, $Ni_{48}Al_{44}Nb_8$, $Cr_{10}Ni_{40}Al_{40}Mo_{10}$, and $Ni_{50}Al_{50}$ seedlayer thickness on the Mrt of a CoCrPtB magnetic film.

Schematic of a normal thin film disk construction.

Selected area electron diffraction pattern of a B2 NiAl film.

Schematic selected area electron diffraction pattern of A2 and B2 structure.

Schematic selected area electron diffraction pattern of A2 and B2 structure.

Effect of $Ni_{40}Al_{40}Mo_{20}$, $Ni_{48}Al_{44}Nb_8$, $Cr_{10}Ni_{40}Al_{40}Mo_{10}$, and $Ni_{50}Al_{50}$ seedlayer thickness on the Mrt of a CoCrPtB magnetic film.

Effect of $Ni_{40}Al_{40}Mo_{20}$, $Ni_{48}Al_{44}Nb_8$, $Cr_{10}Ni_{40}Al_{40}Mo_{10}$, and $Ni_{50}Al_{50}$ seedlayer thickness on the coercivity Hr of a CoCrPtB magnetic film.

Effect of substrate temperature on Hr and Mrt of CoCrPtB film deposited on $Co_{10}Ni_{40}Al_{40}Ti_{10}$ and $Ni_{40}Al_{50}Ti_{10}$ seedlayers.

Effect of $Ni_{48}Al_{42}Nb_{12}$ seedlayer thickness on Hr and Mrt of a CoCrPtB film.

Selected area electron diffraction pattern of a $Cr_{10}Ni_{40}Al_{40}Mo_{10}$ film.

Selected area electron diffraction pattern of a $Ni_{40}Al_{50}Ti_{10}$ film.

Selected area electron diffraction pattern of a
$Co_{10}Ni_{40}Al_{40}Ti_{10}$ film.

MAGNETIC RECORDING MEDIUM HAVING TERNARY OR QUATERNARY ALLOY SEEDLAYER

BACKGROUND OF THE INVENTION

This invention relates generally to a magnetic recording medium such as a magnetic disk, and more particularly the invention relates to a magnetic recording media having a ternary or quaternary alloy seedlayer.

The magnetic disk drive as used for data storage and computer systems comprises one or more disks having thin film magnetic layers on opposing surfaces for the recording of magnetic data as bits along concentric tracks. Typically, as shown in FIG. 1, the disk comprises a substrate 4 of nickel phosphorus (NiP) or ceramic glass on which a plurality of layers are formed by sputtering in a low pressure inert gas atmosphere. The layers include a magnetic seedlayer 6, a nonmagnetic underlayer 8 of either pure chromium (Cr) or a chrome alloy (CrX), covered by a magnetic layer 10 of a cobalt (Co)-based alloy. A protective layer 12 made of sputtered carbon (C) is typically placed on top of the magnetic layer and an organic lubricant 14 may be used on top of the protective layer.

Disclosed and claimed in U.S. Pat. No. 5,693,426 is a magnetic recording medium with an underlayer having a B2 structured crystal lattice and a cobalt-based magnetic layer. The B2 ordered crystalline structure is described as providing a lighter, smaller and better performing magnetic storage medium. The B2 structure is further described as an ordered structural derivative of the body centered cubic (bcc) structure, which is the structure of chromium. A nickel aluminum alloy (NiAl) and other two element alloys are described as providing the B2 lattice structure.

The present invention is directed to providing a magnetic recording medium with improved magnetic performance including coercivity (Hr), remanent magnetization (Mrt), and coercive squareness (S*) without the use of an underlayer having a B2 crystalline structure.

SUMMARY OF THE INVENTION

In accordance with the invention the lattice symmetry of a seedlayer having a B2 structure is broken up by one or more elements added to two-element alloys which typically have B2 lattice structures.

More particularly a magnetic recording medium such as a magnetic disk in accordance with the invention includes a substrate and a seedlayer deposited on the substrate, the seedlayer comprising a ternary or quaternary alloy formed from an alloy selected from the group consisting of NiAl, CoTi, CoAl, NiTi, FeTi, CoFe, CoHf, CuZn, CoZr, and MnAl. A chromium or chrome alloy underlayer is then deposited on the seedlayer, and the cobalt or cobalt based alloy magnetic layer is deposited on the underlayer.

For all quaternary intermetallic alloy seedlayers XY, X is chosen from one or more of the elements selected from the group consisting of Co, Ni, Fe, Cu, V, Mn, and Zn, and Y is chosen from one or more elements selected from the group Al, Nb, Ta, Hf, Zr, Zn, Ag, Au, Pt, and Pd. The atomic percentages of the X and Y elements are 35 to 65 atomic percent of X and 65 to 35 atomic percent of Y.

For seedlayers which have the form NiAl XY, Ni+X is between 35 to 65 atomic percent whereas Al+Y is between 65 to 35 atomic percent. X is chosen from Co, Fe, Cu, Mn, V, and Zn and Y is chosen from Ti, Nb, Ta, Hf, Zr, Zn, Ag, Au, Pt, Pd or a combination of two or more elements from the group.

For seedlayers which have the form CoTiXY, X is chosen from one or more of Co, Fe, Cu, Mn, V, and Zn, whereas Y is chosen from one or more of Nb, Ta, Hf, Zr, Zn, Ag, Au, Pt, and Pd. Co+X is between 35 to 65 atomic percent whereas Ti+Y is between 65 to 35 atomic percent.

The resulting seedlayer does not have a B2 structure and preferably has an A2 lattice structure. The thickness of the seedlayer preferably ranges from 10 nm to 200 nm, whereas the thickness of the magnetic layer ranges from 1 nm to 50 nm.

In accordance with another aspect of the invention, a method of fabricating a magnetic recording medium such as a magnetic disk includes providing a substrate of NiP or ceramic glass, sputtering a seedlayer on the substrate of a B2 type alloy in which the symmetry of the lattice structure is disrupted by the addition of at least one additional element to form an A2 lattice structure, sputtering an underlayer of chromium or chrome alloy on the seedlayer, and sputtering a cobalt or cobalt alloy magnetic layer on the underlayer.

The invention and objects and features thereof will be more readily apparent from the following detailed description and dependent claims when taken with the drawing.

BRIEF DESCRIPTION OF ILLUSTRATIVE EMBODIMENTS

Figure 1:
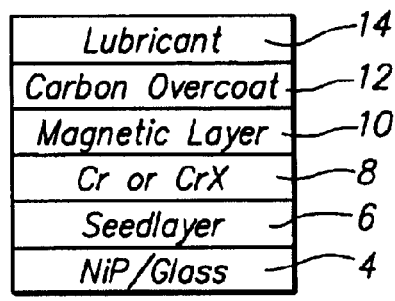
FIG. 1 is a schematic illustrating the construction of a magnetic recording medium according to an embodiment of the present invention.

FIG. 1 is a schematic of a thin film magnetic recording medium such as a magnetic disk in accordance with the prior art, as above described, and in accordance with the embodiments of the present invention when the seedlayer 6 is chosen from a material as described herein.

Figure 2:
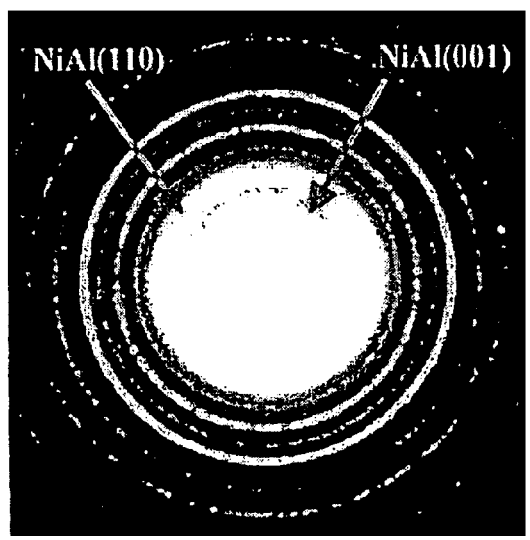
FIG. 2 is an electron diffraction pattern of a selected area of a B2 lattice structure NiAl film.
Figure 3A:
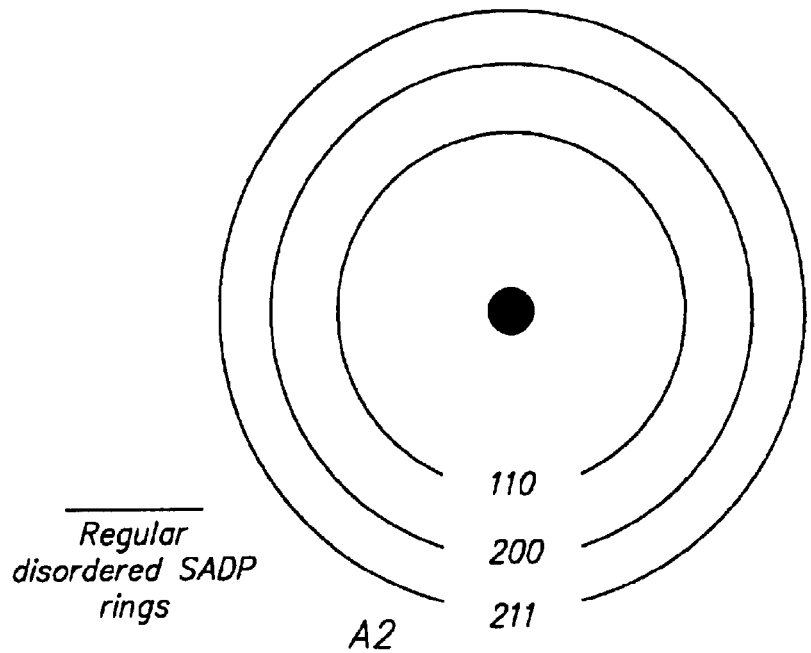
FIGS. 3A and 3B illustrate electron diffraction patterns of A2 lattice and B2 lattice structure materials respectively.
Figure 3B:
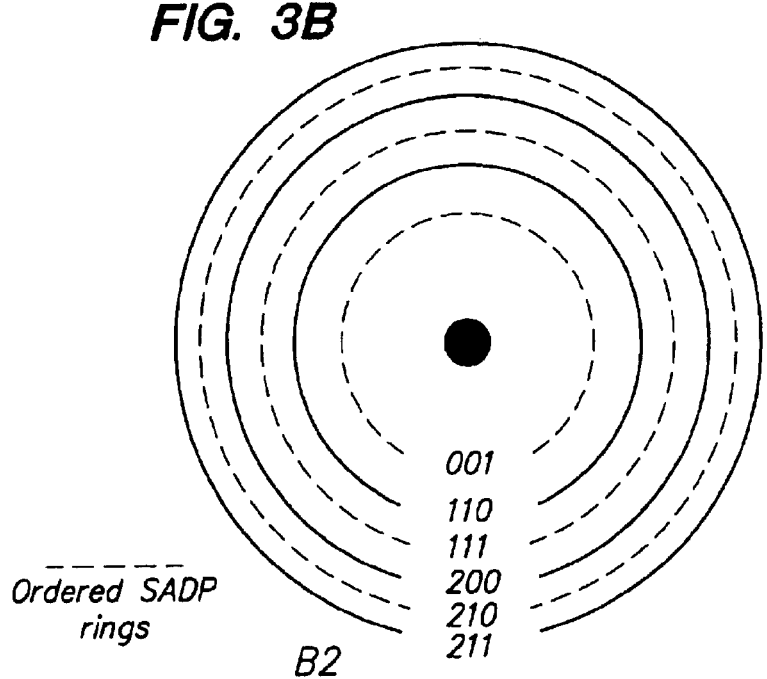
Figure 4:
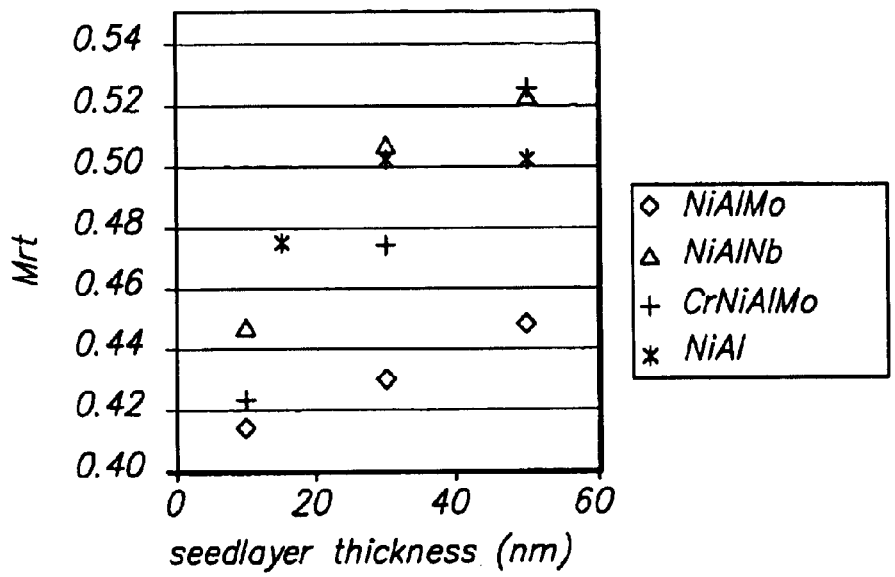
FIGS. 4–7 are graphs illustrating magnetic properties of various layer structures in accordance with the invention.
Figure 5:
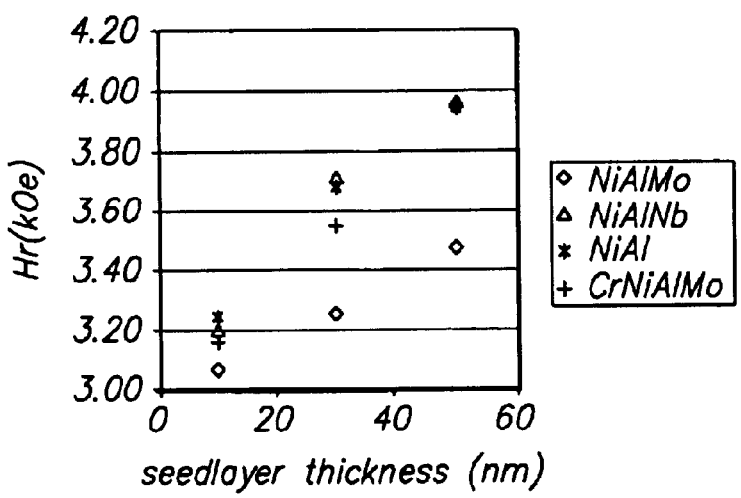
Figure 6:
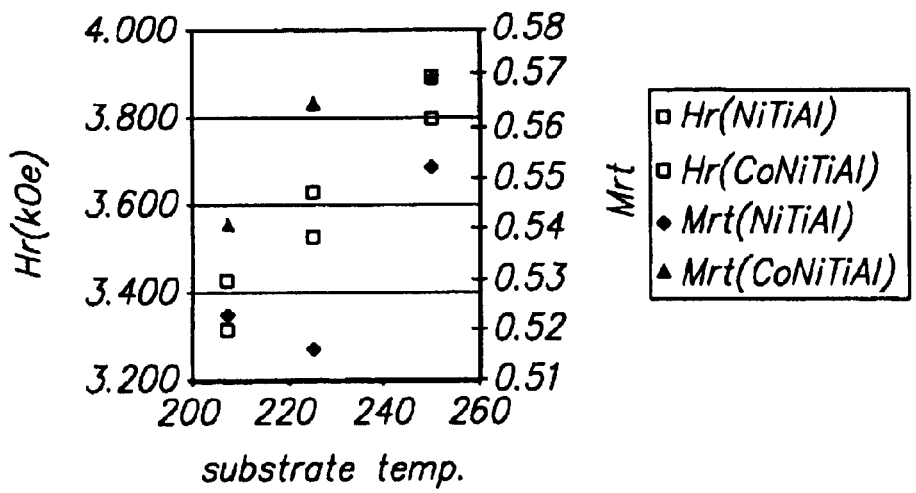
Figure 7:
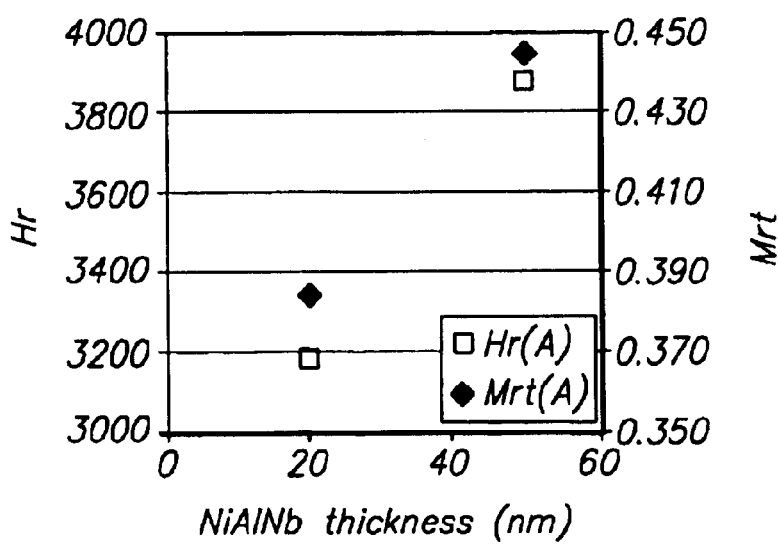

The commonly used seedlayer is $Ni_{50}Al_{50}$ which has an ordered B2 crystal lattice structure. Included in this family of B2 alloys are $Co_{50}Ti_{50}$, $CO_{50}Al_{50}$, $Ni_{50}Ti_{50}$, and $Fe_{50}Al_{50}$. The signature of the B2 structure is the appearance ordered diffraction planes. A selected area of the electron diffraction pattern of a B2 structured NiAl film is shown in FIG. 2. The ordered diffraction plane/rings including the NiAl (001) is present in the film with the strongest diffraction ring being the NiAl (110) which is a regular disordered ring. The difference between a disordered A2 structure and an ordered B2 structure is shown in FIGS. 3A, 3B where for the A2 material (FIG. 3A) regular disordered SADP rings are shown, whereas for the B2 crystal lattice structure of FIG. 3B ordered SADP rings are illustrated. Thus, in the ordered B2 structure, unique extra diffraction rings with a well defined intensity ratio are present.

In accordance with the invention, the normally B2 crystal lattice structure seedlayer material has a third element (ternary) or third and fourth elements (quaternary) atoms added to the alloy to replace aluminum atoms and break up the symmetry of the B2 lattice structure. The resulting seedlayer does not have a B2 symmetric lattice structure and preferably has an A2 lattice structure. The Cr or Cr alloy underlayer film has a thickness ranging from 1 nm to 100 nm while the cobalt or cobalt based alloy magnetic layer ranges in thickness from 1 nm to 50 nm. The thickness of the seedlayer in accordance with the invention ranges from 10 nm to 200 nm.

As noted above, the seedlayer consists of a ternary or quaternary alloy formed from alloying of NiAl, CoTi, CoAl, NiTi, FeTi, CoFe, CoHf, CuZn, CoZr, MnAl, and other two element B2 lattice structure alloys where for all intermetallic seedlayers XY, X is between 35 to 65 atomic percent and Y makes up the balance. X can be chosen from one or more elements selected from the group Co, Ni, Fe, Cu, V, Mn, and Zn, whereas Y is chosen from one or more elements selected from the group consisting of Al, Nb, Ta, Hf, Zr, Zn, Ag, Au, Pt, and Pd.

For the seedlayers which have the form NiAlXY, Ni+X is between 35 to 65 atomic percent and the Al+Y makes up the balance. X can be chosen from Co, Fe, Cu, Mn, V, Zn or combinations thereof, whereas Y is chosen from Ti, Nb, Ta, Hf, Zr, Zn, Ag, Au, Pt, Pd or combinations thereof.

For seedlayers which have the form CoTiXY, Co+X is between 35 to 65 atomic percent while the Ti+Y makes up the balance. X can be chosen from Co, Fe, Cu, Mn, V Zn or combinations thereof whereas Y can be chosen from Nb, Ta, Hf, Zr, Zn, Ag, Au, Pt, Pd or combinations thereof.

The remanent coercivity (Hr) and remanence thickness (Mrt) strongly depend on the seedlayer thickness and substrate temperature. FIGS. 4–7 show the magnetic properties of CoCrPtB/CrMo films deposited on $Ni_{50}Al_{50}$ and on $Co_{10}Ni_{40}Al_{40}Ti_{10}$, $Ni_{48}Al_{44}Nb_8$, $Cr_{10}Ni_{40}Al_{40}Mo_{10}$, $Ni_{48}Al_{42}Nb_{12}$, $Ni_{40}Al_{50}Ti_{10}$, and $Ni_{40}Al_{40}Mo_{20}$ ternary and quaternary seedlayers.

Figure 8:
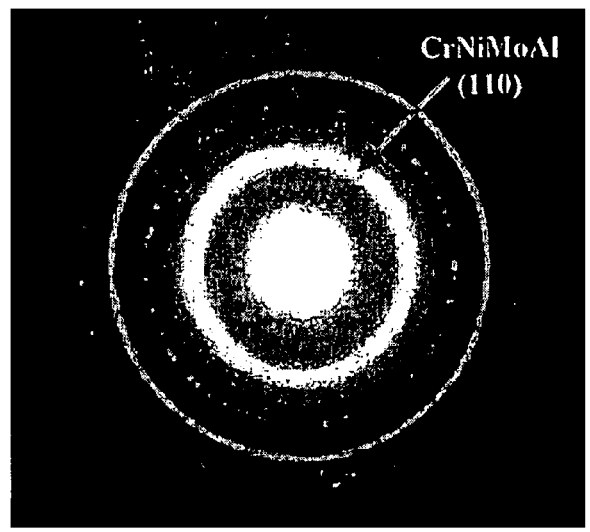
FIGS. 8–10 illustrate selected area electron diffraction of three seedlayers of material in accordance with the invention.
Figure 9:
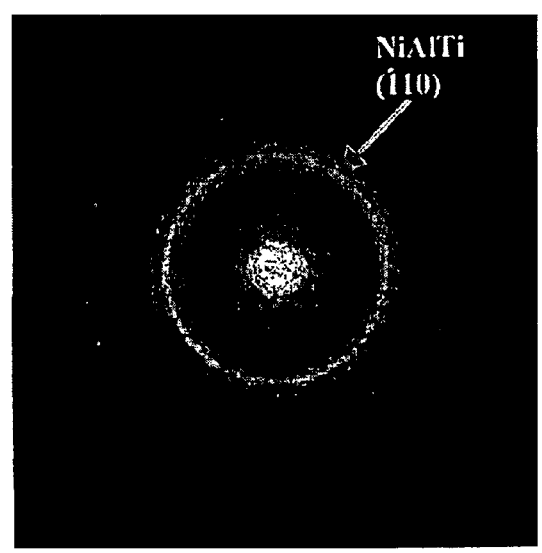
Figure 10:
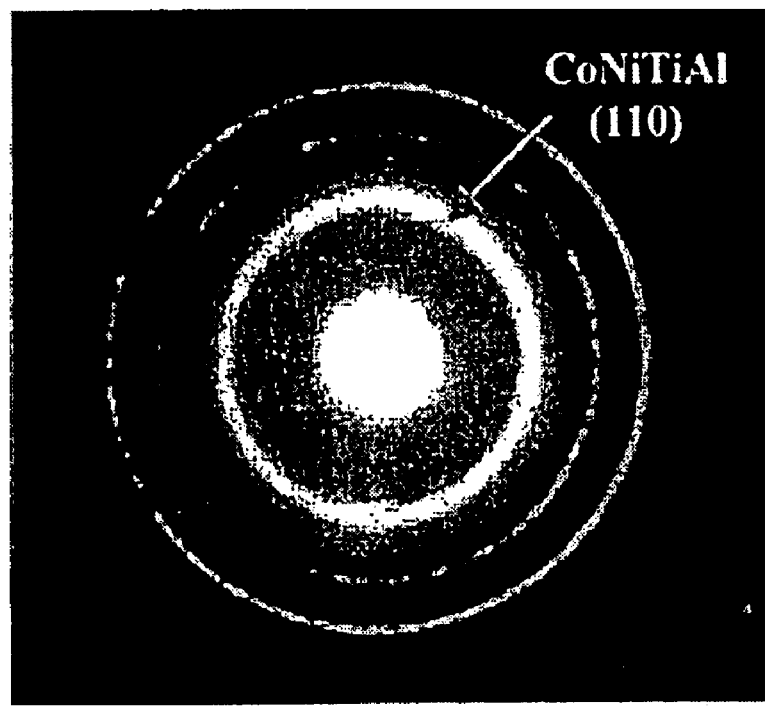

FIGS. 8–10 show selected the area electron diffraction of three of the seedlayers. The B2 ordered diffraction rings such as (001), (111), and (210) are missing. Hence, the ternary and quaternary seedlayers used do not have the B2 crystal lattice structure. From the appearance of the diffraction rings, the films appear to have an A2 crystal lattice structure. The lattice parameter as measured from the various ternary and quaternary alloys have an A2 bcc structure and a lattice parameter between 2.80 rum and 3.20 nm.

There have been described embodiments of a magnetic recording medium including a substrate, seedlayer, underlayer, and cobalt or cobalt alloy based magnetic layer wherein the seedlayer does not have a B2 crystal lattice structure as in the prior art. However, the seedlayers in accordance with the invention promote improved magnetic performance.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A magnetic recording medium, comprising:
a substrate;
a seedlayer deposited on the substrate, wherein the seedlayer includes a ternary or quaternary intermetallic alloy with an A2 lattice structure that contacts the substrate;
a chromium or chrome alloy underlayer deposited on the seedlayer; and
a cobalt or cobalt alloy magnetic layer deposited on the underlayer.

2. The magnetic recording medium of claim 1, wherein the substrate is NiP.

3. The magnetic recording medium of claim 1, wherein the substrate is glass.

4. The magnetic recording medium of claim 1, wherein the seedlayer is the ternary intermetallic alloy.

5. The magnetic recording medium of claim 1, wherein the seedlayer is the quaternary intermetallic alloy.

6. The magnetic recording medium of claim 1, wherein the intermetallic alloy includes a compound selected from the group consisting of NiAl, CoTi, CoAl, NiTi, FeTi, CoFe, CoHf, CuZn, CoZr, and MnAl.

7. The magnetic recording medium of claim 1, wherein the intermetallic alloy has the form XY, X is between 35 to 65 atomic percent and Y is 65 to 35 atomic percent, X is one or more elements selected from the group consisting of Co, Ni, Fe, Cu, V, Mn, and Zn, Y is one or more elements selected from the group consisting of Al, Nb, Ta, Hf, Zr, Zn, Ag, Au, Pt, and Pd, and X and Y do not both include Zn.

8. The magnetic recording medium of claim 1, wherein the intermetallic alloy has the form NiAlXY, Ni+X is 35 to 65 atomic percent, Al+Y is between 65 to 35 atomic percent, X is an element selected from the group consisting of Co, Fe, Cu, Mn, V, and Zn, Y is an element selected from the group consisting of Ti, Nb, Ta, Hf, Zr, Zn, Ag, Au, Pt, and Pd, and X and Y do not both include Zn.

9. The magnetic recording medium of claim wherein the intermetallic alloy has the form CoTiXY, Co+X is between 35 to 65 atomic percent, Ti+Y is between 65 to 35 atomic percent, X is an element selected from the group consisting of Fe, Cu, Mn, V, and Zn, Y is an element selected from the group consisting of Nb, Ta, Hf, Zr, Zn, Ag, Au, Pt, and Pd, and X and Y do not both include Zn.

10. The magnetic recording medium of claim 1, wherein the intermetallic alloy is selected from the group consisting of $Co_{10}Ni_{40}Al_{40}Ti_{10}Ni_{48}Al_{44}Nb_8$, $Cr_{10}Ni_{40}Al_{40}Mo_{10}$, $Ni_{48}Al_{42}Nb_{12}$, $Ni_{40}Al_{50}Ti_{10}$, and $Ni_{40}Al_{40}Mo_{20}$.

11. The magnetic recording medium of claim 1, wherein the intermetallic alloy contains Ni between 40 to 48 atomic percent and Al between 40 to 50 atomic percent.

12. The magnetic recording medium of claim 1, wherein the intermetallic alloy contains Al between 35 to 65 atomic percent.

13. The magnetic recording medium of claim 1, wherein the intermetallic alloy contains Al between 40 to 50 atomic percent.

14. A magnetic recording medium, comprising:
a substrate;
a seedlayer deposited on the substrate, wherein the seedlayer includes an intermetallic alloy, the intermetallic alloy includes a B2 type alloy in which the symmetry of the lattice is disrupted by the addition of at least one additional element to form an A2 lattice structure, and the intermetallic alloy contacts the substrate;
a chromium or chrome alloy underlayer deposited on the seedlayer; and
a cobalt or cobalt alloy magnetic layer deposited on the underlayer.

15. The magnetic recording medium of claim 14, wherein the substrate is NiP.

16. The magnetic recording medium of claim 14, wherein the substrate is glassy.

17. The magnetic recording medium of claim 14, wherein the seedlayer is a ternary intermetallic alloy.

18. The magnetic recording medium of claim 14, wherein the seedlayer is a quaternary intermetallic alloy.

19. The magnetic recording medium of claim 14, wherein the B2 type alloy is selected from the group consisting of NiAl, CoTi, CoAl, NiTi, FeTi, CoFe, CoHf, CuZn, CoZr, and MnAl.

20. The magnetic recording medium of claim 14, wherein the intermetallic alloy has the form XY, X is between 35 to 65 atomic percent and Y is 65 to 35 atomic percent, X is one or more elements selected from the group consisting of Co, Ni, Fe, Cu, V, Mn, and Zn, Y is one or more elements selected from the group consisting of Al, Nb, Ta, Hf, Zr, Zn, Ag, Au, Pt, and Pd, and X and Y do not both include Zn.

21. The magnetic recording medium of claim 14, wherein the intermetallic alloy has the form NiAlXY, Ni+X is 35 to 65 atomic percent, Al+Y is between 65 to 35 atomic percent, X is one or more elements selected from the group consisting of Co, Fe, Cu, Mn, V, and Zn, Y is one or more elements selected from the group consisting of Ti, Nb, Ta, Hf; Zr, Zn, Ag, Au, Pt, and Pd, and X and Y do not both include Zn.

22. The magnetic recording medium of claim 14, wherein the intermetallic alloy has the form CoTiXY, Co+X is between 35 to 65 atomic percent, Ti+Y is between 65 to 35 atomic percent, X is one or more elements selected from the group consisting of Fe, Cu, Mn, V, and Zn, Y is one or more elements selected from the group consisting of Nb, Ta, Hf, Zr, Zn, Ag, Au, Pt, and Pd, and X and Y do not both include Zn.

23. The magnetic recording medium of claim 14, wherein the intermetallic alloy is selected from the group consisting of $Co_{10}Ni_{40}Al_{40}Ti_{10}$, $Ni_{48}Al_{44}Nb_8$, $Cr_{10}Ni_{40}Al_{40}Mo_{10}$, $Ni_{48}Al_{42}Nb_{12}$, $Ni_{40}Al_{50}Ti_{10}$, and $Ni_{40}Al_{40}Mo_{20}$.

24. The magnetic recording medium of claim 14, wherein the intermetallic alloy contains Ni between 40 to 48 atomic percent and Al between 40 to 50 atomic percent.

25. The magnetic recording medium of claim 14, wherein the intermetallic alloy contains Al between 35 to 65 atomic percent.

26. The magnetic recording medium of claim 14, wherein the intermetallic alloy contains Al between 40 to 50 atomic percent.

* * * * *